(12) United States Patent
Oda et al.

(10) Patent No.: US 9,061,597 B2
(45) Date of Patent: Jun. 23, 2015

(54) QUICK CHARGER AND QUICK CHARGING SYSTEM FOR ELECTRIC VEHICLE

(75) Inventors: Masaru Oda, Higashimurayama (JP); Koichi Umezawa, Tokyo (JP); Toshiyuki Utsuki, Tachikawa (JP); Yoshitomo Sakayori, Chiba (JP); Shoji Kawai, Ichinomiya (JP); Masakatsu Horii, Inazawa (JP)

(73) Assignee: HITACHI, LTD., Tokyo (JP)

( * ) Notice: Subject to any disclaimer, the term of this patent is extended or adjusted under 35 U.S.C. 154(b) by 387 days.

(21) Appl. No.: 13/567,189

(22) Filed: Aug. 6, 2012

(65) Prior Publication Data

US 2013/0069588 A1   Mar. 21, 2013

(30) Foreign Application Priority Data

Sep. 21, 2011   (JP) ................. 2011-206095

(51) Int. Cl.
 *H02J 7/00* (2006.01)
 *B60L 11/18* (2006.01)

(52) U.S. Cl.
 CPC ........... *B60L 11/1825* (2013.01); *B60L 11/185* (2013.01); *B60L 2230/12* (2013.01); *Y02T 10/7088* (2013.01); *Y02T 10/7005* (2013.01); *Y02T 90/121* (2013.01); *Y02T 90/14* (2013.01); *Y02T 90/128* (2013.01)

(58) Field of Classification Search
 CPC . Y02T 10/7088; Y02T 90/14; Y02T 10/7005; Y02T 90/121; Y02T 10/6217; B60L 11/1838; H02J 7/0026; H02J 7/04; G06Q 30/0601
 USPC .................. 320/108, 109, 107, 101
 See application file for complete search history.

(56) References Cited

U.S. PATENT DOCUMENTS

| | | | | |
|---|---|---|---|---|
| 5,594,318 | A * | 1/1997 | Nor et al. ...................... | 320/108 |
| 6,459,234 | B2 * | 10/2002 | Kajiura ......................... | 320/109 |
| 2001/0003413 | A1 * | 6/2001 | Kajiura ......................... | 320/108 |
| 2001/0004201 | A1 * | 6/2001 | Kajiura ......................... | 320/109 |

(Continued)

FOREIGN PATENT DOCUMENTS

| | | |
|---|---|---|
| CN | 1964157 A | 5/2007 |
| CN | 101497350 A | 8/2009 |

(Continued)

OTHER PUBLICATIONS

County of Sonoma "Electric Vehicle Charging Station Grogram and Installation Guidelines" General Services Deparment, Jul. 2011.*

(Continued)

*Primary Examiner* — Brian Ngo
(74) *Attorney, Agent, or Firm* — Mattingly & Malur, PC

(57) ABSTRACT

An object of the present invention is to provide a quick charger for an electric vehicle in which a quick charging cable can be compactly stored, which is excellent in safety, and in which the burden on a user in operations is lightened.

Provided is a quick charger for an electric vehicle including: an operation panel provided on the front face of a body housing; an outlet for a charging cable provided on one side face of the body housing; a charging connector housing unit that is provided on the other side face of the body housing to hold a charging connector in the body housing; and a charging cable receiver that is provided at a lower part of the body housing, wherein the charging cable receiver has a function of holding an intermediate part of the charging cable.

14 Claims, 22 Drawing Sheets

(56) References Cited

U.S. PATENT DOCUMENTS

| | | | | |
|---|---|---|---|---|
| 2010/0201309 A1* | 8/2010 | Meek | | 320/108 |
| 2010/0315040 A1* | 12/2010 | Sakurai | | 320/109 |
| 2011/0055037 A1* | 3/2011 | Hayashigawa et al. | | 705/26.1 |
| 2011/0140656 A1* | 6/2011 | Starr et al. | | 320/109 |

FOREIGN PATENT DOCUMENTS

| | | | |
|---|---|---|---|
| JP | 11-122714 | A | 4/1999 |
| JP | 2010-263665 | A | 11/2010 |
| JP | 2010-283946 | A | 12/2010 |
| JP | 2011-130592 | A | 6/2011 |

OTHER PUBLICATIONS

Chinese Office Action received in corresponding Chinese Application No. 201210285424.8 dated Jun. 11, 2014.

* cited by examiner

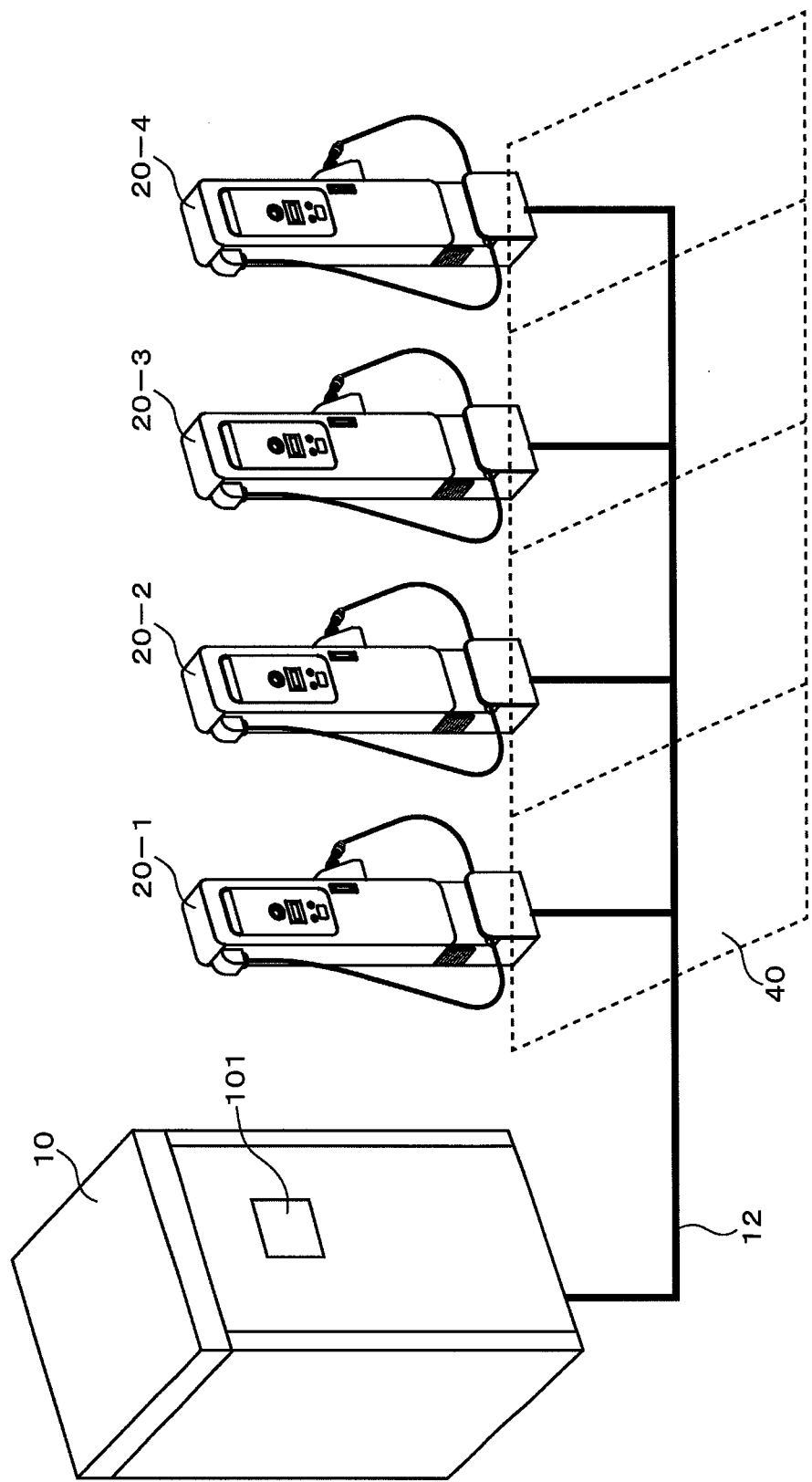

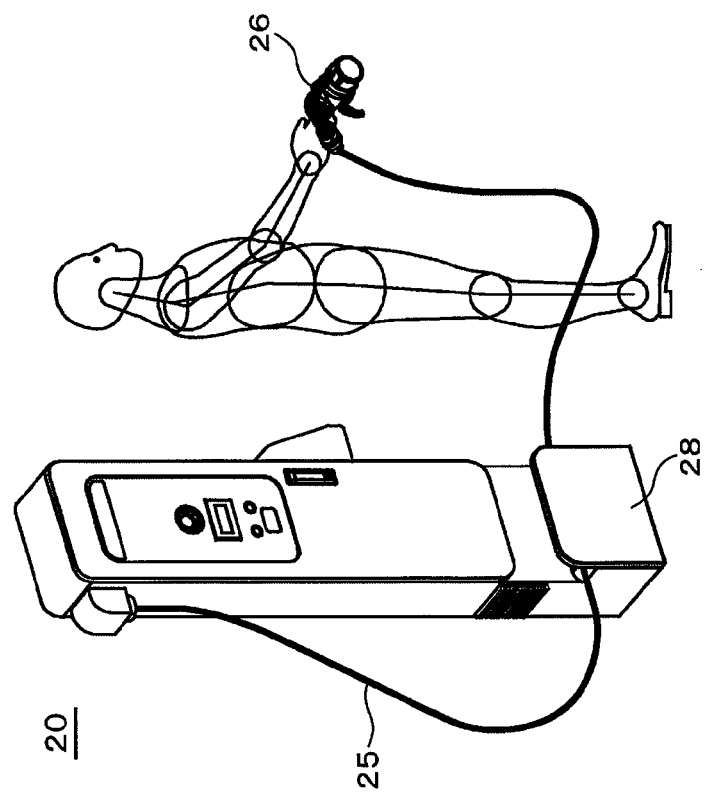
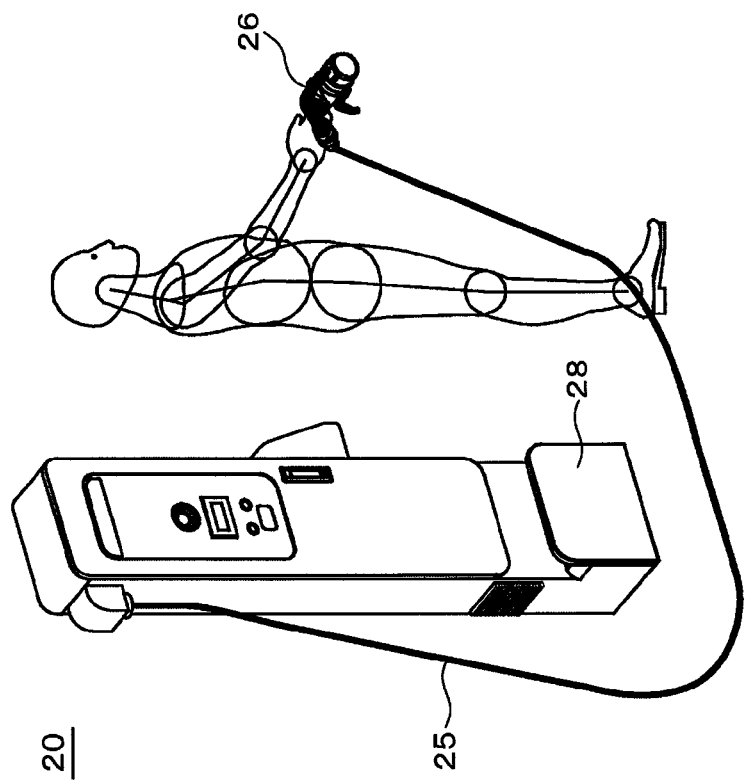
FIG.9A
FIG.9B

FIG. 15B
FIG. 15C
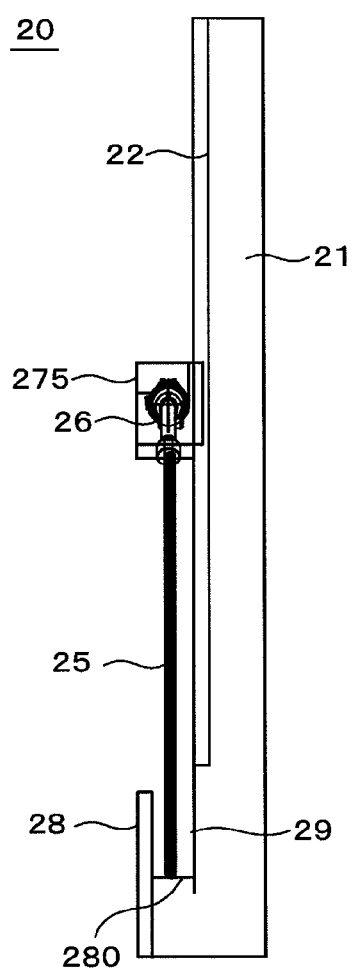
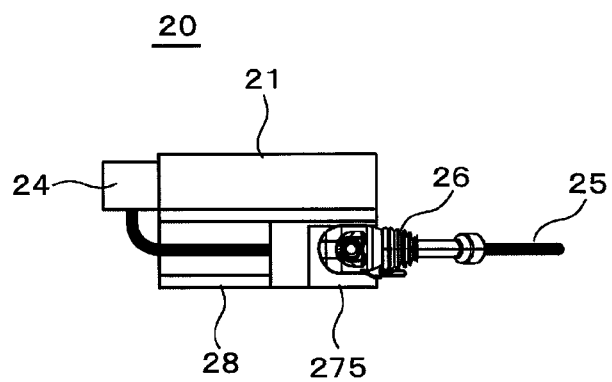

QUICK CHARGER AND QUICK CHARGING SYSTEM FOR ELECTRIC VEHICLE

CLAIM OF PRIORITY

The present application claims priority from Japanese Patent Application JP 2011-206095 filed on Sep. 21, 2011, The contents of which is hereby incorporated by reference into this application.

FIELD OF THE INVENTION

The present invention relates to a quick charger and a quick charging system for an electric vehicle, and particularly to a quick charging stand and a quick charging system suitable for a self-service system in which a user charges a vehicle by himself/herself.

DESCRIPTION OF THE RELATED ART

While entering a stage of full-scale, widespread use of electric vehicles, improvement of charging infrastructure is becoming important. The charging infrastructure includes a normal charging system by which a battery is charged for several hours and a quick charging system by which a battery is charged in a short time of 15 to 30 minutes. There is a growing need for the quick charging system to improve the convenience of electric vehicles.

With regard to a quick charging method for an electric vehicle, for example, CHAdeMO (registered trademark) is a common standard of a quick charging system used when charging an electric vehicle.

Japanese Patent Application Laid-Open Publication No. 2011-130592 discloses a quick charging apparatus in which one quick charger has distributers to make it possible to simultaneously charge plural electric vehicles.

In order to achieve an object of providing a charging apparatus in which a heavy and bulky charging cable can be compactly held at a low cost while keeping a load balance, Japanese Patent Application Laid-Open Publication No. 2010-283946 discloses a charging apparatus in which a charging cable housing unit with a door is provided in a body housing and an opening portion through which at least a part of a stored charging cable is visible from outside is provided.

Further, there has been known a method in which a charging cable extends outward from an outlet of one side face of a body housing of a charging stand in a quick charger, and a charging connector provided at a tip end of the charging cable is provided on the same side face of the body housing or is provided on the front face of the body housing near the side face to be held.

SUMMARY OF THE INVENTION

Unlike petrol pump of gasoline, vehicle chargers can be installed at various places. However, when the vehicle charger is installed at a narrow space such as a parking lot, downsizing and space-saving are required. Further, the arrangement of a charging port of a vehicle is different depending on the type of vehicle. Thus, a charging cable is required to have a sufficient length, so that the charging cable can reach the charging port even at a parking lot where the parking direction is restricted. In general, a 3 m to 5 m charging cable is used. On the other hand, the charging cable of the quick charger becomes difficult to bend and becomes heavy due to its large diameter because an incorporated electric wire becomes thick to supply high-voltage power and a sufficient cladding thickness around the electric wire is required, thus resulting in a problem in operability.

Especially, when assuming a self-service system in which a user charges a vehicle by himself/herself, it is important to consider the operability and safety.

In Japanese Patent Application Laid-Open Publication No. 2011-130592, the operability and safety of a charging cable in such a quick charger are not described.

The charging apparatus described in Japanese Patent Application Laid-Open Publication No. 2010-283946 is configured in such a manner that a long charging cable is stored while being rolled up at a hooking/holding unit (hook or the like) provided in a charging cable housing unit inside a door. When downsizing and space-saving are considered, it becomes difficult in operability to roll up and store a quick charging cable at a narrow space. In contrast, when charging, it is necessary to rewind the charging cable, and thus the burden on a user in operability is increased. Further, in a state where the charging cable is rolled up, the charging cable tends to be rolled due to the burden on the charging cable. In addition, when the charging cable is pulled out, the charging cable does not become stable.

On the other hand, in a method where the outlet for the charging cable and the charging connector housing unit are held on the same outer side face of the body housing or the front face near the side face, the effort of housing the cable can be saved. However, if the charging cable is long, an intermediate part of the charging cable hangs and touches the ground (or floor face) in a non-charging state. When the surface of the charging cable is brought into contact with the ground, there is a problem in safety that the charging cable is scratched by being rubbed on the ground and the charging cable itself is damaged. Further, the position of the hanging charging cable does not become stable, and there is a possibility that the hanging charging cable touches a vehicle to scratch the surface of the vehicle in the body housing of a narrow parking lot. Further, there is a risk that a user stumbles over the charging cable. Furthermore, it is necessary to remove stains on the surface of the charging cable that touched the ground.

In order to address the above-described problems of the related art, an object of the present invention is to provide a quick charging stand and a quick charging system for an electric vehicle in which a quick charging cable can be compactly stored, which is excellent in safety, and in which the burden on a user in operations is lightened.

The following is a representative example of the present invention. The present invention provides a quick charger for an electric vehicle including: a body housing; a control unit installed inside the body housing; an operation panel provided on the front face of the body housing; a charging cable that connects the control unit to a charging connector; an outlet for the charging cable provided on one side face of the body housing; a charging connector housing unit that is provided on the other side face of the body housing to hold the charging connector in the body housing; and a charging cable receiver that is provided at a lower part of the body housing, wherein the charging cable receiver has a function of holding an intermediate part of the charging cable at a lower part of the body housing.

According to an aspect of the present invention, even though the apparatus is a downsized and space-saving apparatus, it is possible to provide a quick charger for an electric vehicle in which the burden on a user in operations is lightened and which is excellent in safety.

BRIEF DESCRIPTION OF THE DRAWINGS

FIG. 1 is a diagram for showing a configuration of a quick charging system for an electric vehicle, having separated quick charging stands according to a first embodiment of the present invention;

FIG. 9A is a diagram explaining a state in which the charging cable is used in the first embodiment;

FIG. 9B is a diagram explaining a state in which the charging cable is used in the first embodiment;

FIG. 15B is a side view of the seventh embodiment;

FIG. 15C is a plan view of the seventh embodiment;

DETAILED DESCRIPTION OF THE EMBODIMENTS

Figure 2A:
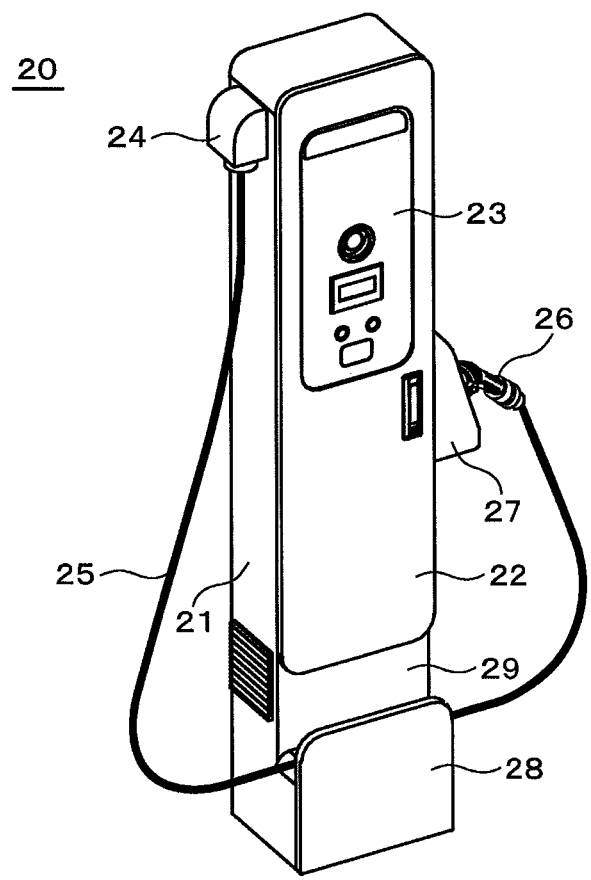
FIG. 2A is an external perspective view of the separated quick charging stand according to the first embodiment.

A quick charger for an electric vehicle of the present invention includes an operation panel provided on the front face of a body housing, an outlet for a charging cable provided on one side face of the body housing, a charging connector housing unit provided on the other side face of the body housing to hold a charging connector in the body housing, and a charging cable receiver provided at a lower part of the body housing. The charging cable receiver has a function of holding an intermediate part of the charging cable at a lower part of the body housing. Hereinafter, embodiments of the present invention will be described in detail with reference to the drawings.

First Embodiment

FIG. 1 is a diagram for showing a configuration of a quick charging system for an electric vehicle, with separated quick charging stands (quick chargers) according to a first embodiment of the present invention. In FIG. 1, the reference numeral 10 denotes a converter that is connected to 4 separated quick charging stands 20 (20-1, 20-2, 20-3, and 20-4) through a connection cable 12. The reference numeral 40 denotes parking spaces. The converter 10 includes an operation panel 101. It should be noted that one quick charging stand is installed at each parking space in the example of FIG. 1. However, the quick charging stands 20 may be installed so that one quick charging stand 20 can be shared by cars parked at two adjacent parking spaces 40. In addition, one converter and one to four quick charging stands may be combined in some cases in accordance with the conditions of the parking spaces.

Figure 2B:
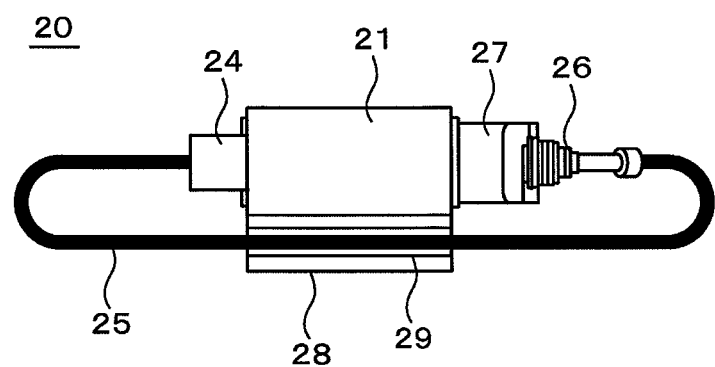
FIG. 2B is a top view of the quick charging stand according to the first embodiment.

As shown in FIG. 2A and FIG. 2B, each of the separated quick charging stands 20 includes a body housing 21 formed in the shape of a rectangular parallelepiped-like box, a front door 22 attached on the front face of the body housing 21, an operation display panel 23 provided at an upper part on the outside of the front door 22, a charging cable outlet 24 provided at an upper part of the left side of the body housing 21, a charging connector 26 formed at a tip end of a charging cable 25, and a charging connector housing unit 27 provided at an intermediate part of the right side of the body housing 21. As described above, the charging cable outlet 24 and the charging connector housing unit 27 are asymmetrically provided on the left and right sides of the body housing 21, respectively. Since no charging cable outlet 24 is provided on the same side as the charging connector housing unit 27, there is no projection on which a user possibly hits his/her head when removing the charging connector 26, leading to safe operations. It should be noted that the positional relation between the charging cable outlet 24 and the charging connector housing unit 27 relative to the body housing 21 may be opposite.

The charging cable 25 is configured in such a manner that, for example, two power lines and one pilot control line are integrated with a pressing roll tape and these are stored in a cylindrical heat-resistant vinyl sheath.

The operation display panel 23 provided at an upper part of the front face of the front door 22 is an input/output unit for a control device inside the body housing 21. The operation display panel 23 has a GUI function, and includes, for example, an input screen with a start button, a stop button, an emergency stop button, and icons with which a user inputs necessary information or performs an operation at the time of charging, and an operation display section for displaying the operational state of the quick charging stand. The charging connector housing unit 27 is located on a side face of the body housing 21, and the charging connector 26 is stored sideways with respect to the body housing 21. Further, a charging cable receiver 28 is provided on the front face of the body housing 21 while protruding from a lower part of the front door 22, and a cable receiving space 29 is formed between the inner side of the charging cable receiver 28 and the surface of the body housing 21. In a state where the charging connector 26 is stored in the charging connector housing unit 27, an intermediate part of the charging cable 25 is held at the cable receiving space 29.

Figure 3A:
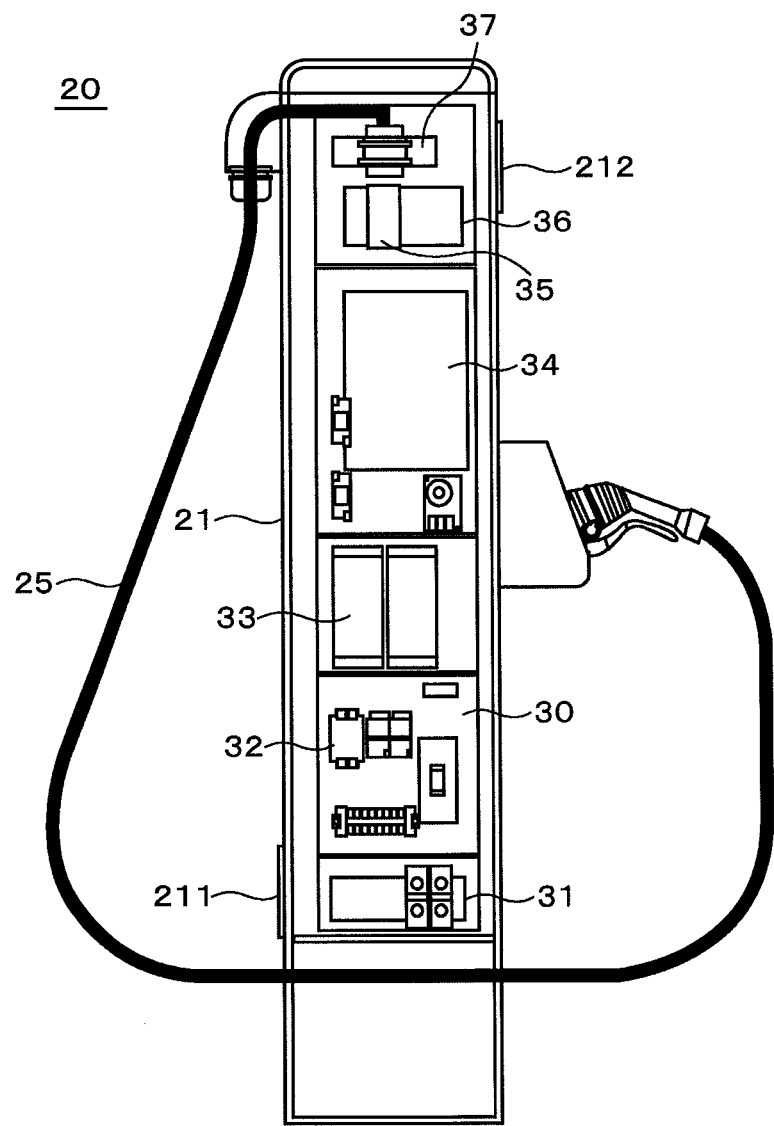
FIG. 3A is a front cross-sectional view of the quick charging stand according to the first embodiment.
Figure 3B:
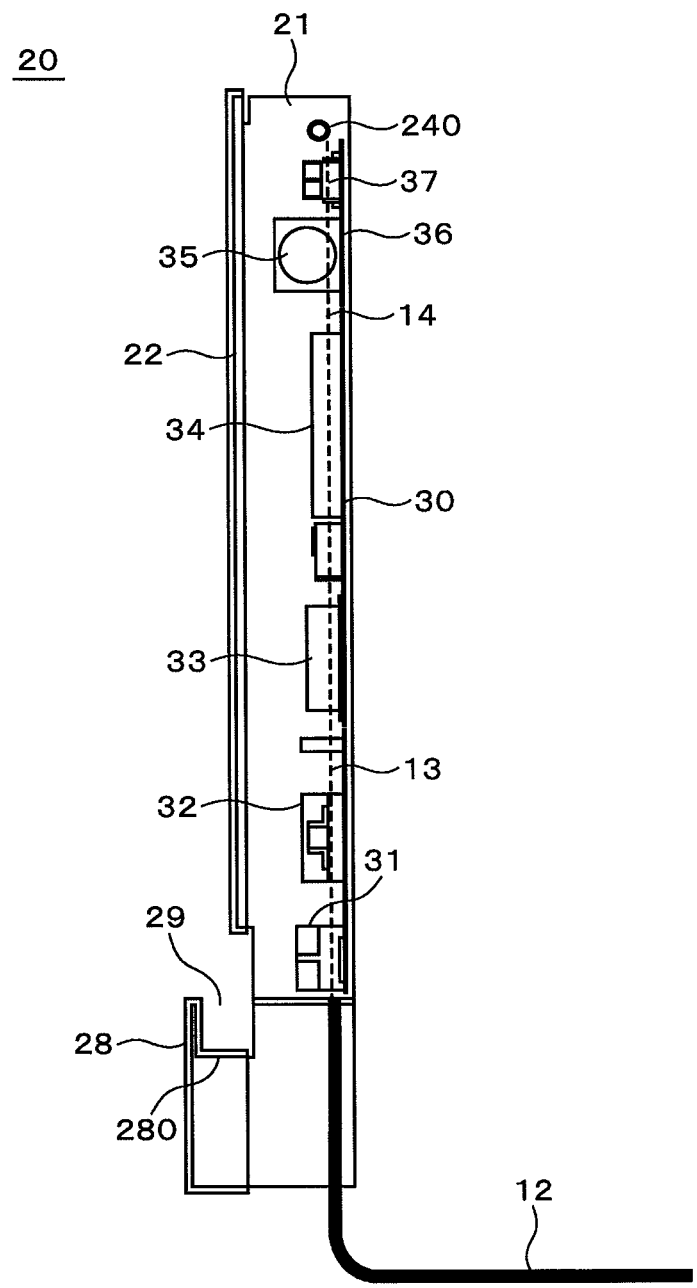
FIG. 3B is a side cross-sectional view of the quick charging stand according to the first embodiment.

As shown in FIG. 3A and FIG. 3B, a power supply and control devices as a control unit for the quick charging stand are housed inside the body housing 21. Specifically, circuits for allowing DC charging current to flow such as DC charging current control components 31 and 32, a 12V/24V power supply 33, and a control substrate 34, and a control device for controlling the DC charging current are mounted on a substrate 30. A cooling fan 35 and a heat sink 36 for heat release are integrally arranged at an uppermost part in the box. A cooling air sucking port 211 and a discharging port 212 are provided at a lower part on the left side and an upper part on the right side in the box, respectively. The connection cable 12 for power supply extends upward from the lower side in the body housing 21 to become a connection cable 13 (see FIG. 3B) that is connected to the control unit, and the connection cable 13 further extends upward, as a connection cable 14 (see FIG. 3B), from the control unit to be connected to the charging cable 25 at a cable holding unit 37 located at an uppermost part in the box. The charging cable 25 reaches the charging cable outlet 24 on the left face of the body housing 21 through a hole 240 provided at a side part of the box, and further extends outside the body housing 21. Electric power supplied from the cable 14 to a battery of a vehicle through the charging cable 25 is controlled by the control units such as the control components 31 and 32. The charging cable receiver 28 includes a cable receiving unit 280 for holding an intermediate portion of the charging cable 25 (see FIG. 3B). It should be noted that the connection cables 13 and 14 in the body housing 21 are not illustrated in detail in FIG. 3A.

Figure 4:
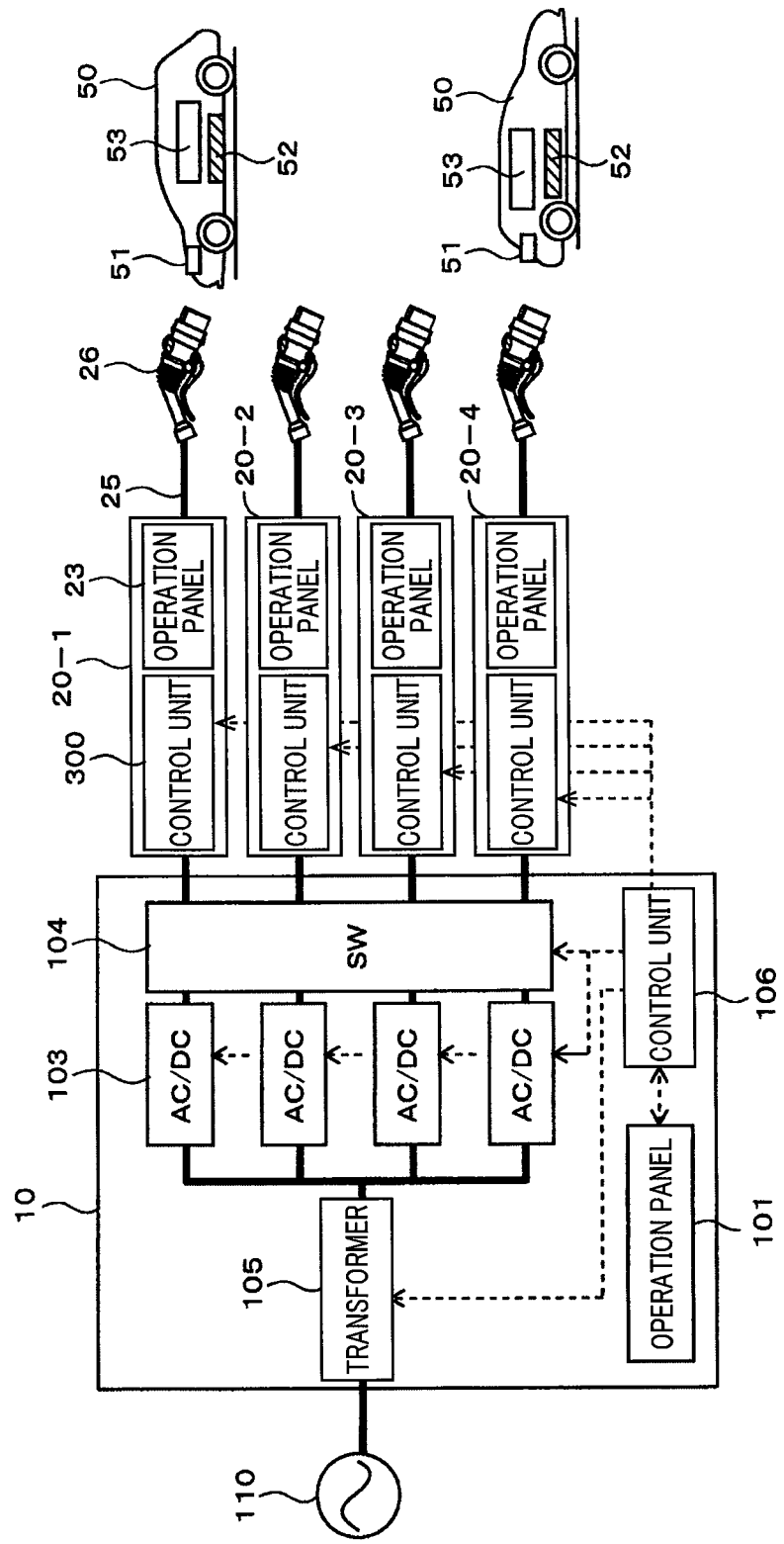
FIG. 4 is a pattern view for showing an example of a circuit configuration of the charging system for the electric vehicle according to the first embodiment.

FIG. 4 shows an example of a circuit configuration of the charging system according to the embodiment. The converter 10 includes a booster transformer 105 connected to an external commercial AC power supply 110, four AC/DC converters 103, and a switch 104 the outputs of which are connected to the respective separated quick charging stands 20-1, 20-2, 20-3, and 20-4 through the connection cables 12. Further, the converter 10 includes a converter control unit 106 and an operation panel 101, and receives an instruction from the operation panel 101 or information from the quick charging stands 20 to control the devices controlled by the converter such as the booster transformer 105, the converters 103 and the switch 104, so that electric power supplied to the quick charging stands 20 is controlled. The charging connector 26 provided at a tip end of the charging cable 25 of the quick charging stand 20 is connected to a power feeding port 51 of a vehicle 50 to charge a battery 52. A control unit (a power supply and a control device) 300 of each of the quick charging stands 20 transmits and receives data about the charging status of the battery 52 to/from a control unit (ECU) 53 of the vehicle 50 by receiving an instruction from the operation panel 23 or through a signal line in the charging cable 25. On the basis of the result, the control unit 300 controls electric power charged to the battery 52. The control unit 300 outputs DC current to the vehicle 50 through an exchange of information in which the control unit 300 transmits operation information of the quick charger to the vehicle through Controller Area Network (CAN) communications, the vehicle transmits a charging permission signal, and the vehicle transmits a charging command value. As described above, the quick charger specifies optimum charging current in accordance with the conditions of the control unit 53 and the battery 52 of the vehicle, and supplies DC current to the vehicle in accordance with commands that are momentarily transmitted from the vehicle.

The quick charging system is separated into one converter and plural quick charging stands. Thus, the quick charging stands are installed near parking spaces and the converter is arranged at another position where a space can be secured, so that the downsizing and space-saving of the quick charging system can be realized as a whole. Further, the downsized and space-saving system can be installed at an existing parking lot as it is.

When a user puts the charging connector 26 in the charging connector housing unit 27 after the charging is completed, an intermediate part of the charging cable 25 is held at the cable receiving space 29 in the charging cable receiver 28 only by lightly putting a hand on the charging cable 25.

The length of the charging cable 25 is about 3 m to 5 m, and the cable has been devised to lighten the burden on a user in operations. Thus, the user can charge without any problems even when the power feeding port 51 of the vehicle 50 is installed at a front portion, a rear portion, or a side portion of the vehicle.

Figure 5:
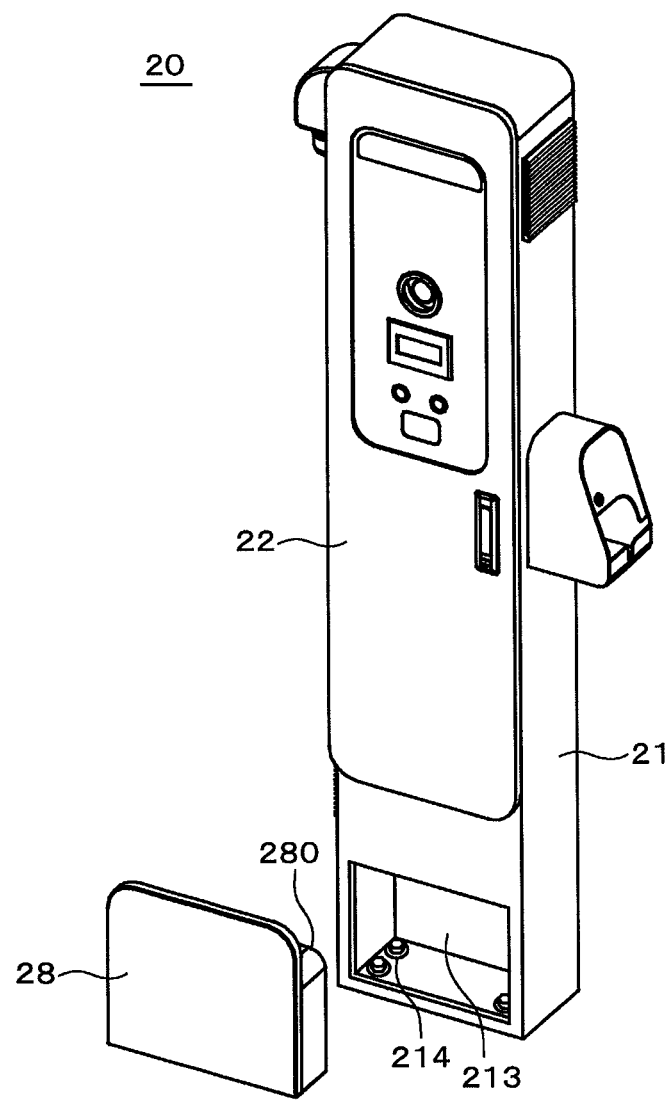
FIG. 5 is a diagram for showing a relation between a body housing and a charging cable receiver of the quick charging stand in the first embodiment.

As shown in FIG. 5, the body housing 21 and the charging cable receiver 28 of the quick charging stand are detachable from each other as different members. In order to secure the predetermined strength of the body housing 21 and the charging cable receiver 28, baking finishing is applied to the surface of a metal material such as a steel sheet. A storage space 213 is provided at a lower part of the body housing 21 of the quick charging stand to store the charging cable receiver 28. The bottom face of the body housing 21 of the quick charging stand is fixed to a floor face with anchor bolts 214 in a state where the charging cable receiver 28 is removed. After the body housing 21 is installed on the floor face, the charging cable receiver 28 is positioned with respect to the body housing 21 so as to secure the cable receiving space 29. Thereafter, the charging cable receiver 28 is integrally fixed to the body housing 21 with fixing means (not shown) such as screws. The anchor bolts 214 to fix the body housing 21 are positioned inside the quick charging stand 20, so that the surrounding area of the charging stand that is brought into contact with the ground becomes neat to prevent a user from stumbling over the anchor bolts or to prevent trash from being piled up. Further, electronic components such as substrates are arranged above the charging cable receiver, and thus a predetermined height from the floor face can be secured. Accordingly, water immersion damage caused by heavy rain can be avoided.

Further, the arrangement position of the charging cable receiver 28 is not limited only to the front face of the body housing 21, but may be a lower part of the side face, namely, the mounting face for the charging cable outlet 24 or a lower part of the mounting face for the charging connector housing unit 27. By arranging the charging cable receiver 28 on a side face, protrusion towards the front side can be suppressed. Thus, the shape of the quick charging stand is advantageous when being installed at a space with little room in the front and rear directions. Hereinafter, the embodiments will be described on the assumption that the charging cable receiver 28 is arranged on the front face of the body housing 21. However, the charging cable receiver 28 can be arranged on a side face in any embodiment.

Next, a method of cooling the inside of the body housing of the quick charging stand will be described with reference to FIG. 6. As shown in FIG. 3A and FIG. 3B, the power supply and the control device as the control unit are housed in the body housing 21 to supply controlled electric power to the battery 52 of the vehicle 50. In quick charging, the battery 52 is quickly charged in about, for example, 15 to 30 minutes. Thus, the charging power of some quick charging stands is about 50 kW. In order to supply such large electric power, generated heating values of the power supply and the control unit are increased. In the embodiment, the cooling fan 35 and the heat sink 36 for heat release are arranged at an uppermost part in the box to cool the inside of the box. The cooling air sucking port 211 and the discharging port 212 are provided at a lower part on the left side and an upper part on the right side of the box, respectively. In the body housing 21, a space for housing the power supply and the control device is separated from the storage space 213 using, for example, a partition plate. Further, the charging connector housing unit 27 is arranged at a position lower than the discharging port 212.

Figure 6:
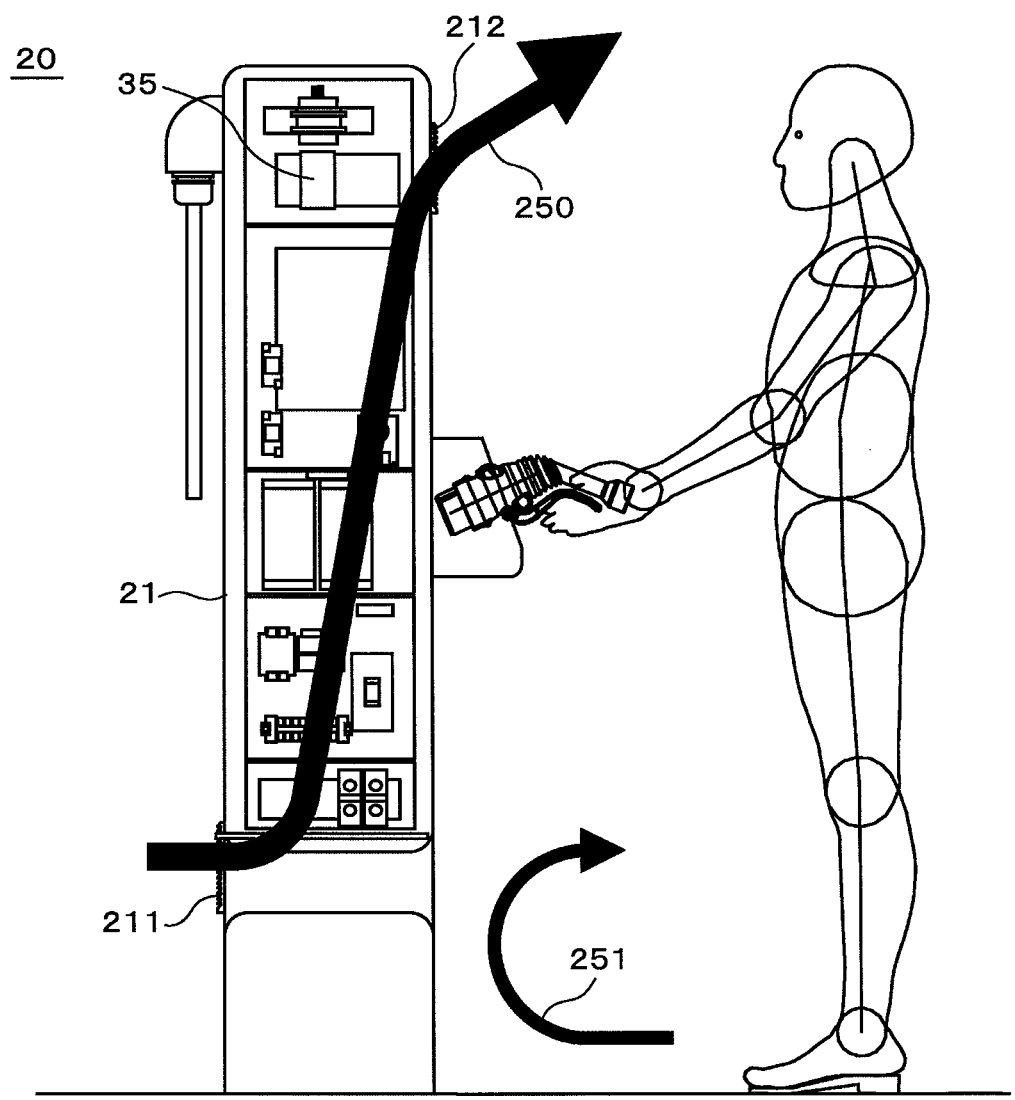
FIG. 6 is a diagram for explaining a method of cooling the inside of the body housing of the quick charging stand in the first embodiment.

Thus, when the cooling fan 35 is rotated, an oblique air flow 250 flowing upward from the lower side in the body housing is generated as shown in FIG. 6 to efficiently cool the power supply and the control unit, and the air after cooling is discharged obliquely upward from the discharging port located at an upper part. It should be noted that if the cooling air sucking port 211 is provided on the same side face as the charging connector housing unit 27, there is a possibility that an air flow 251 containing dust scattered in the air by the movement of a user is sucked into the body housing 21. Thus, the cooling air sucking port 211 is preferably provided on the side face opposite to the charging connector housing unit 27.

Figure 7A:
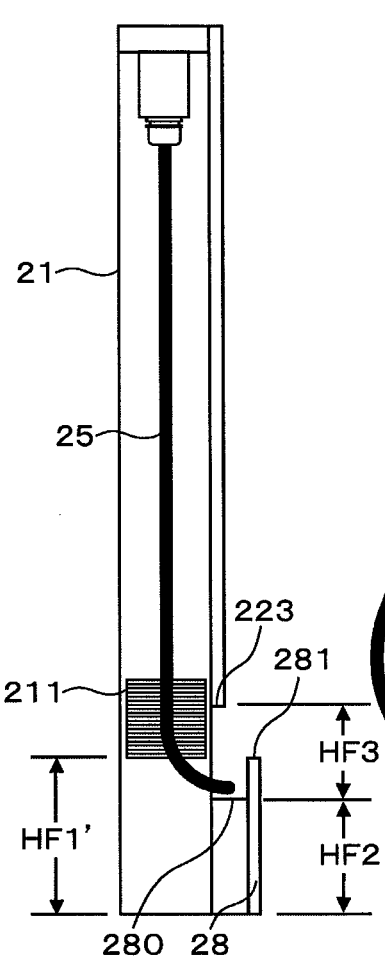
FIG. 7A is a diagram explaining a positional relation between the body housing, a charging cable, and the charging cable receiver of the quick charging stand in the first embodiment.
Figure 7B:
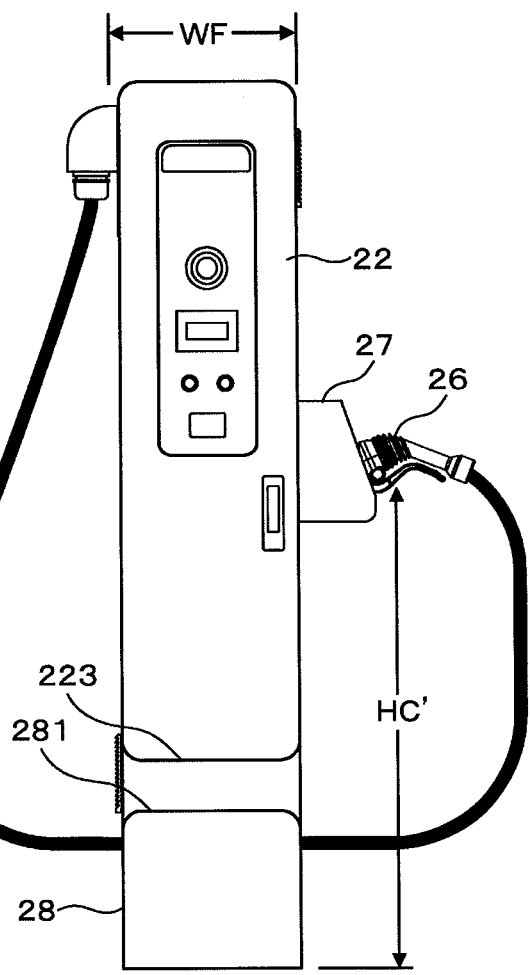
FIG. 7B is a diagram explaining a positional relation between the body housing, a charging cable, and the charging cable receiver of the quick charging stand in the first embodiment.
Figure 7C:
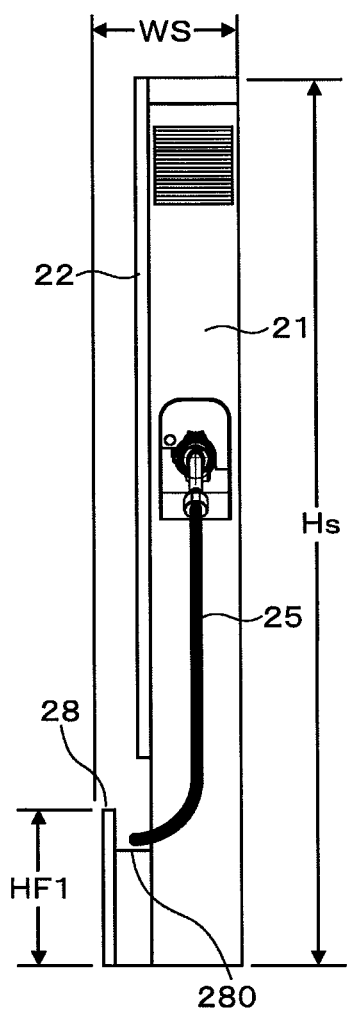
FIG. 7C is a diagram each explaining a positional relation between the body housing, a charging cable, and the charging cable receiver of the quick charging stand in the first embodiment.

Next, a positional relation between the body housing, the charging cable, and the charging cable receiver of the quick charging stand in the embodiment will be described with reference to FIGS. 7A, 7B and 7C.

As described above, the main object of the present invention is to lighten the burden on a user in operations of the quick charging system and to realize downsizing and space-saving. If it is assumed that the height, front width, and side width of the body housing of the separated quick charging stand in the embodiment are represented by Hs, WF, and WS, respectively, Hs, WF, and WS are 1700 mm, 345 mm, and 270 mm, respectively, as an example of concrete sizes. The height Hs of the body housing is about 1700 mm in many cases due to the conditions of delivery, installation work, maintenance, installation environments and the like. With these sizes Hs, WF, and WS, the separated quick charging stand can be installed close to a parking space even in a narrow space such as a parking lot.

Figure 8A:
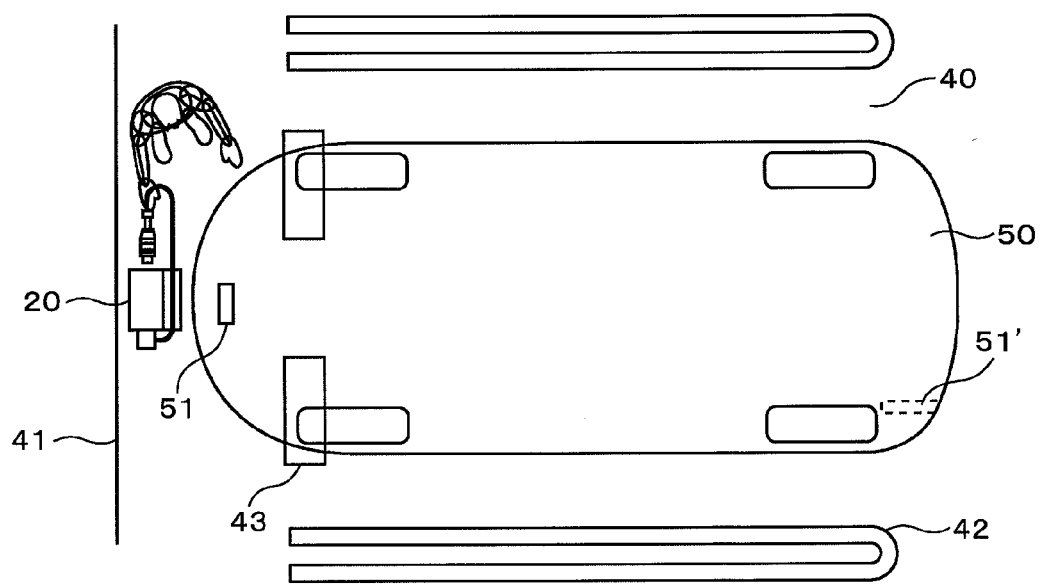
FIG. 8A is a plan view for showing a state in which the separated quick charging stand is installed at a parking lot in the first embodiment.
Figure 8B:
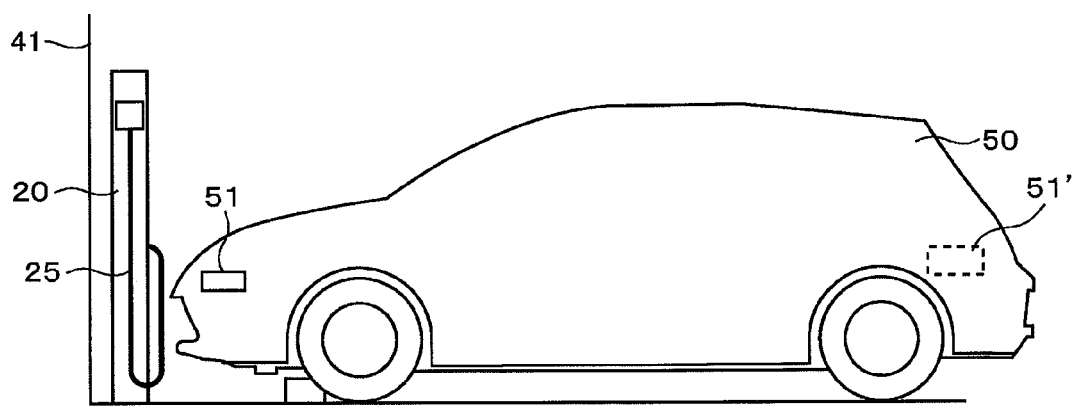
FIG. 8B is a side view for showing a state in which the separated quick charging stand is installed at a parking lot in the first embodiment.

As described above, the separated quick charging stand in the embodiment can be made compact. Thus, the separated quick charging stand can be sufficiently installed even if, for example, a space between a parking space and a wall of a building is narrow, such as an indoor parking lot or a parking lot between buildings. FIG. 8A and FIG. 8B are plan views each showing a state in which the separated quick charging stand is installed at an indoor parking lot or a parking lot between buildings. For example, even if an interval between a wheel stopper 43 and a wall 41 of a building is only about 1 m and an interval between adjacent parking spaces is only about 2.0 m to 2.5 m, there is no problem in installing the separated quick charging stand 20 in each parking space because WF is 345 mm and WS is 270 mm, and the charging connector 26 is removed sideways from the body housing. In the case where electric power cannot be fed because the power feeding port 51 is located apart from the separated quick charging stand 20 and the length of the charging cable 25 is short, it is obvious that the parking direction of the vehicle 50 is reversed.

Referring back to FIGS. 7A, 7B and 7C, it is assumed that the height of the charging connector housing unit, the height of the charging cable receiver 28 up to an upper edge 281, the height of the cable receiving unit 280, the height of the cooling air sucking port 211, and the height difference from the cable receiving unit 280 to a lower edge 223 of the front door 22 are HC, HF1, HF2, HF1', and HF3, respectively. HC is set so that a user can easily put or take out the charging connector 26 in/from the charging connector housing unit 27 while standing. HF2 is set so that a user can easily take out the charging cable 25 from the cable receiving space 29. Further, as HF2 becomes higher, it is possible to reduce the possibility that the charging cable is brought into contact with the ground. On the other hand, in order to mount the control units such as the control components 31 and 32 inside the front door 22 without being laminated, a minimum area is necessary on the substrate 30. According to the viewpoint of increasing the area of the substrate 30, it is preferable that the front width WF of the body housing be increased and the height (HF2+HF3) up to the lower edge 223 of the front door 22 be decreased. Due to demand of downsizing, the front width WF cannot be largely increased. On the other hand, it is important to secure a predetermined height from the floor face up to the lower edge 223 of the front door 22 so as to avoid the risk that the power supply and the control unit are submerged at the time of water immersion caused by heavy rain. HF1 is a height obtained by adding the height of a wall to HF2 to prevent the cable from automatically protruding. The space (an inlet portion of the cable receiving space 29) between the lower edge 223 of the front door 22 and the upper edge 281 of the charging cable receiver 28 is necessary to secure the use-friendliness of the charging cable receiver 28. Further, the height difference (space) between the lower edge 223 and the upper edge 281 is necessary for maintenance of the quick charging stand and is necessary to eliminate trouble when the front door 22 is opened or closed. Further, the height HF1' of the cooling air sucking port 211 should be considered so as to sufficiently cool the power supply and the control unit mounted on the substrate 30.

The following is an example of concrete sizes satisfying the above-described viewpoints. HC is 900 mm, HF1 and HF1' are 300 mm, HF2 is 200 mm, and HF3 is 200 mm. Further, the height of the wall (HF1−HF2) is desirably about 80 mm to 100 mm. Further, |(HF3+HF2)−HF1| is set at 100 mm or larger, so that the user-friendliness of the charging cable receiver 28 can be secured.

Further, the height HF2 of the cable receiving unit 280 is preferably set so that the charging cable does not touch the ground in the case where the charging cable 25 (length L=about 3 m to 5 m) is stored in the charging connector housing unit 27 without being rolled up. According to the embodiment, the outlet for the charging cable 25 is arranged around an upper end of one side face of the body housing 21, the charging connector housing unit 27 is arranged at an intermediate part of the other side face of the charger body housing 21, and the charging cable receiver 28 is provided at a lower part of the front face of the body housing. Accordingly, while the separated quick charging stand is formed in a compact shape, a distance to hold the entire charging cable 25 is secured by utilizing the shape of the body housing 21 of the quick charging stand. Therefore, if the length L of the charging cable is relatively short, the charging cable can be held at a height where the charging cable does not touch the ground. Accordingly, it is possible to suppress the possibility that the heat-resistant vinyl sheath on the surface of the charging cable is scratched by being rubbed on the ground to have an adverse effect on insulation characteristics of the charging cable. In addition, it is possible to reduce the possibility that the charging cable touches the ground and the surface thereof becomes tainted.

On the other hand, in the case where the length L of the charging cable is 5 m or near 5 m, a part of the charging cable held at the charging cable receiver 28 is occasionally brought into contact with the ground at the time of non-charging. However, the position of an intermediate part of the charging cable 25 is held above the ground or floor by the charging cable receiver 28 even in this case. Thus, the contact area between the charging cable 25 and the ground can be limited, and it is possible to considerably reduce the possibility that the surface is rubbed and scratched. Further, the position of an intermediate part of the charging cable 25 is fixed, so that the charging cable 25 can be prevented from being left at an unintended place. In addition, even in the case of a narrow parking lot, it is possible to reduce the possibility that the charging cable 25 touches a parked car to scratch the surface thereof or gets in the way of a pedestrian.

Further, the outlet for the charging cable 25 and the charging connector housing unit 27 are provided on the right and left sides of the body housing 21, respectively, the charging cable receiver 28 is provided at a lower part of the front face of the body housing, and the charging cable 25 is held in a natural state without being rolled up. Accordingly, no burden is placed on the charging cable 25, the charging cable 25 tends not to be rolled, and the operability of a user is not reduced at the time of charging.

The quick charging system of the present invention is compact and safe, and is excellent in operability of a user. Thus, the quick charging system of the present invention is suitable for use in a self-service quick charging stand. In the case where a user charges by himself/herself, the charging connector 26 is only taken out from the charging connector housing unit 27 with one hand (an operation of removing a tied charging cable is not needed) to be fitted into the vehicle 50. Thereafter, charging the vehicle can be started immediately after the operation display panel 23 is operated and the conditions of starting the charging are right.

FIGS. 9A and 9B are diagrams each showing a state in which, for example, a user charges by himself/herself with the quick charging stand of the embodiment. FIG. 9A shows a state in which a user charges while holding the charging cable 25 in the charging cable receiver 28, and FIG. 9B shows a state in which a user charges while removing the charging cable 25 from the charging cable receiver 28. The user can appropriately select a usage state in accordance with a positional relation between the quick charging stand and the power feeding port 51 of the vehicle 50. When the charging is completed, it is only necessary to set the charging connector 26 at the charging connector housing unit 27 with one hand while considering that an intermediate part of the charging cable 25 is held in the charging cable receiver 28. The charging cable 25 can be easily put in a predetermined position without being rolled up. As described above, even in the case where the length of the charging cable 25 is long and the weight thereof is heavy, the burden on a user in the operability can be lightened at the time of charging or housing the charging cable 25 due to the provision of the charging cable receiver 28.

Figure 10:
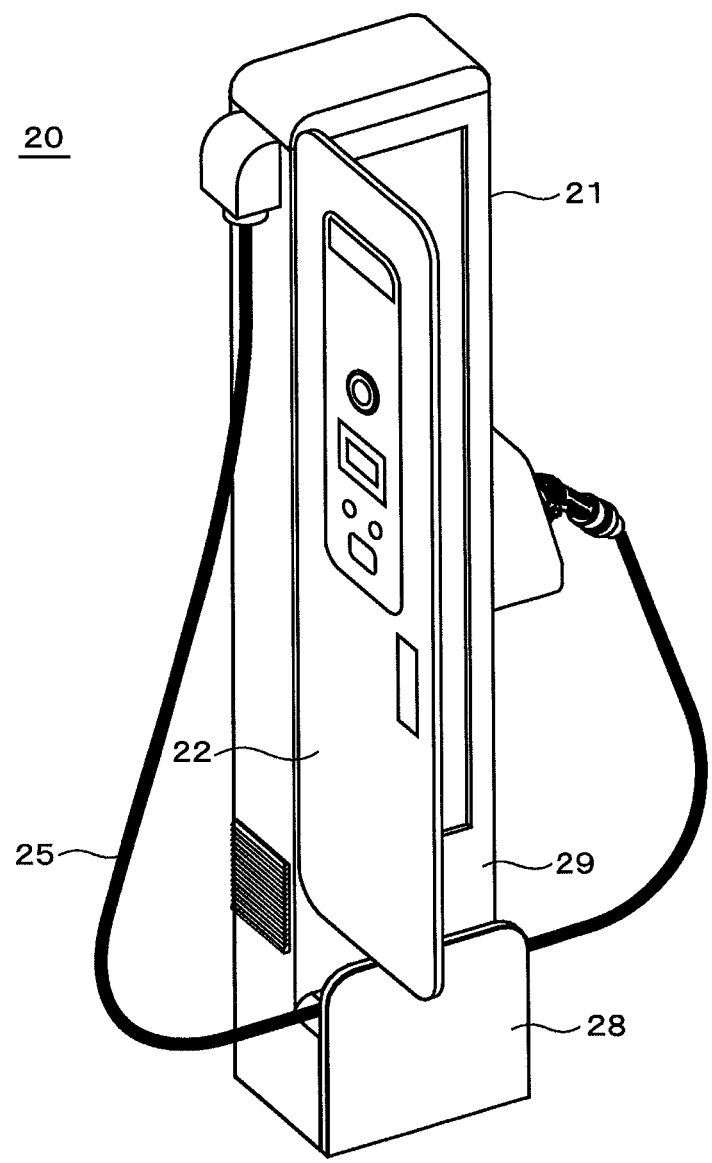
FIG. 10 is a diagram for explaining a relation between a front door, the charging cable, and the charging cable receiver in the first embodiment.

FIG. 10 shows a state in which an administrator opens the front door 22 for maintenance of the power supply and the control unit in the body housing of the quick the charging stand. For maintenance of the power supply and the control unit, the charging cable 25 is generally held at the charging cable receiver 28. In order to prevent trouble in opening and closing the front door 22 in this state, the difference (space) of a predetermined height is secured between the lower edge 223 of the front door 22 and the upper edge 281 of the charging cable receiver 28 (See FIG. 7A).

As described above, according to the embodiment, the quick charging system is configured using one converter and plural quick charging stands, the quick charging stands are installed at respective parking spaces, and the converter is arranged at another position where a space can be secured, so that downsizing and space-saving can be realized as a whole. In addition, even though the apparatus is a downsized and space-saving apparatus, it is possible to provide the quick charging stand in which the quick charging cable can be compactly stored on the front face of the body housing, which is excellent in safety, and in which the burden on a user in operations is lightened.

Second Embodiment

Next, a quick charging stand according to a second embodiment of the present invention will be described with reference to FIG. 11A and FIG. 11B. In this example, a member to reduce friction with the charging cable is provided at the cable receiving unit 280 of the charging cable receiver 28. Specifically, the second embodiment is different from the first embodiment in the structure of the cable receiving unit 280. It should be noted that the front part of the charging cable receiver 28 is not illustrated to easily understand. The configuration other than the cable receiving unit 280 is the same as that of the charging cable receiver 28 according to the first embodiment shown in FIG. 5.

Figure 11A:
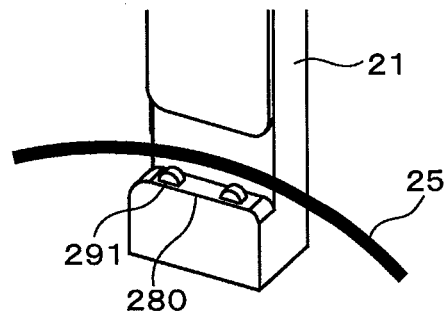
FIG. 11A is a diagram for showing a configuration example of the inside of a charging cable receiver of a quick charging stand according to a second embodiment of the present invention.

In the example of FIG. 11A, rollers 291 are provided at the cable receiving unit 280 to rotatably hold the charging cable 25. In the case where the charging cable 25 is pulled in the right or left direction when a user operates the charging connector 26, the rollers 291 are rotated. Thus, it is possible to reduce friction between the cable receiving unit 280 and the charging cable 25. Accordingly, it is possible to further reduce the possibility that the surface of the charging cable 25 is damaged. In addition, the movement of the charging cable 25 becomes better and the operability is improved.

Figure 11B:
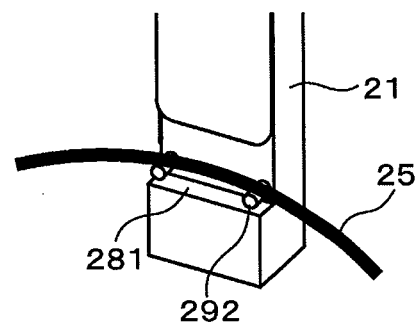
FIG. 11B is a diagram for showing another configuration example of the inside of the charging cable receiver of the quick charging stand according to the second embodiment of the present invention.

In the example of FIG. 11B, cylindrical fixed pins 292 are provided on a flat cable receiving unit 281 to hold the charging cable 25. The fixed pins 292 are brought into contact with the charging cable 25, so that the contact area is reduced. Accordingly, the friction is reduced, and the surface of the charging cable can be less damaged.

Figure 11C:
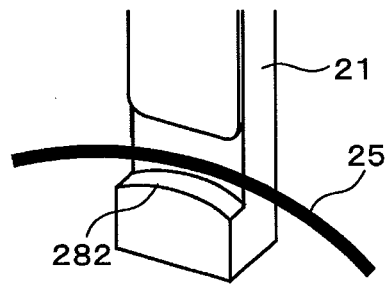
FIG. 11C is a diagram for showing still another configuration example of the inside of the charging cable receiver of the quick charging stand according to the second embodiment of the present invention.

In the example of FIG. 11C, the surface of a cable receiving unit 282 is formed in an arc-like shape. Accordingly, the friction is reduced, and the surface of the charging cable can be less damaged. The surface of the cable receiving unit 282 may be coated with a film to ease the friction. As described above, by improving the movement of the charging cable 25, the burden on a user in operations can be more lightened in the self-service quick charging stand.

According to the embodiment, even though the apparatus is a downsized and space-saving apparatus, it is possible to provide the quick charging stand in which the quick charging cable can be compactly stored, which is excellent in safety, and in which the burden on a user in operations is lightened.

Third Embodiment

The example shown in FIG. 8A is a case in which the parking space in the indoor parking lot or the parking lot between buildings has little room on the front side, but has much room on the right and left sides. However, in the case of a parking space in a corner of an indoor parking lot, there is little room not only on the front side, but also on the right or left side or both sides. A third embodiment provides a quick charging stand that can be adapted to such a restricted parking space.

Figure 12A:
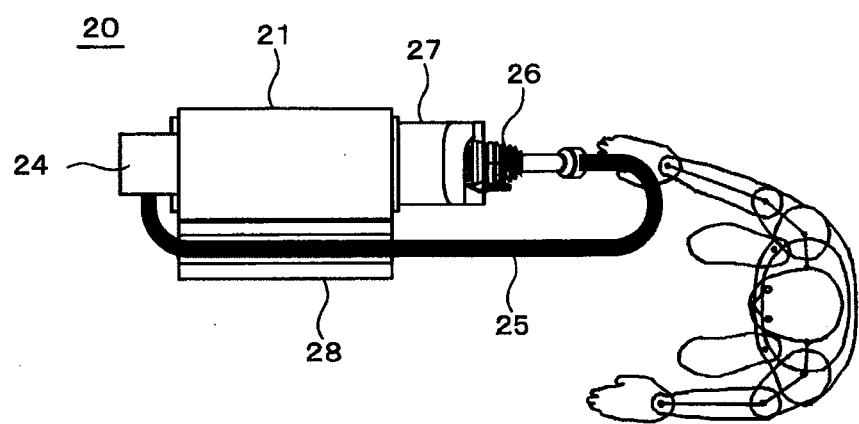
FIG. 12A is a diagram for showing an example of a holding method of a charging cable with respect to a body housing of a separated quick charging stand according to a third embodiment of the present invention.

First, the example of FIG. 12A shows the quick charging stand 20 that can be adapted to a parking space with little room on the front and left sides. The third embodiment is the same as the first embodiment in that the charging cable outlet 24 is provided at an upper part of one side face of the body housing 21, the charging connector housing unit 27 is provided at an intermediate part on the right side, and the charging cable receiver 28 is provided at a lower part of the front face of the body housing. In the third embodiment, the length of the protrusion of the charging connector housing unit 27 towards the right side of the body housing 21 is made long, and the length of the protrusion of the charging cable 25 towards the left side is suppressed, so that the quick charging stand with which the right space can be used as a whole is realized. Such a quick charging stand is preferably installed at a parking space with less room on the left side.

According to the embodiment, it is possible to provide the compact quick charging stand which is excellent in safety and in which the burden on a user in operations is lightened.

Fourth Embodiment

Figure 12B:
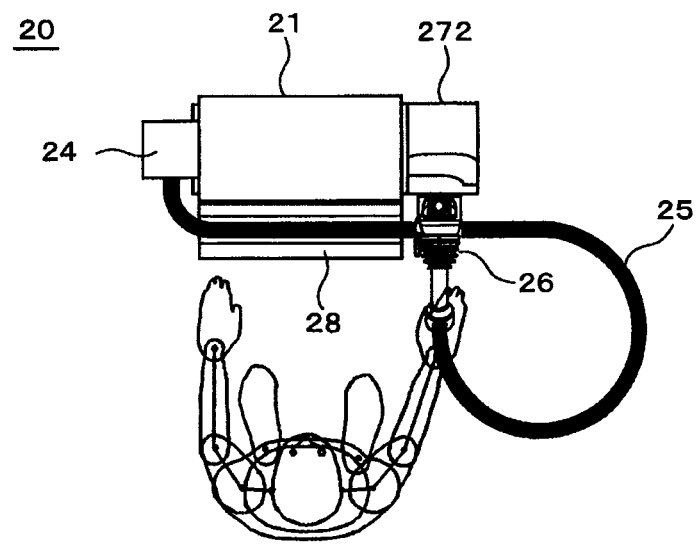
FIG. 12B is a diagram for showing an example of a holding method of a charging cable with respect to a body housing of a separated quick charging stand according to a fourth embodiment of the present invention.

Next, FIG. 12B shows another example of the quick charging stand 20 that can be adapted to a parking space with little room on the front, right and left sides. The example of FIG. 12B is the same as that of FIG. 12A in that the charging cable outlet 24 is provided at an upper part of one side face of the body housing 21, the charging connector housing unit 27 is provided at an intermediate part on the right side, and the charging cable receiver 28 is provided at a lower part of the front face of the body housing. In the embodiment, the mounting direction of the charging connector 26 with respect to the charging connector housing unit 27 is turned by 90 degrees on the near side as compared to the example of FIG. 12A. The mounting direction of the charging connector 26 with respect to the charging connector housing unit 27 is changed to suppress the length of the protrusion of the charging cable 25 towards the right and left sides. Accordingly, the quick charging stand with which the right and left spaces can be used as a whole is realized. Such a quick charging stand is preferably installed at a parking space with little room on the right and left sides and with a little room on the front and rear sides.

According to the embodiment, it is possible to provide the compact quick charging stand which is excellent in safety and in which the burden on a user in operations is lightened.

Fifth Embodiment

The configuration of the charging cable receiver is not limited to that shown in the first embodiment. In the first embodiment, the charging cable receiver 28 is fixed to the body housing 21, but may be stored inside the body housing at the time of non-charging.

Figure 13A:
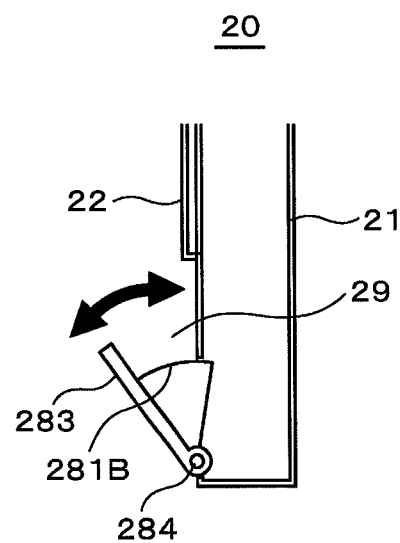
FIG. 13A is a diagram for showing a configuration example of a charging cable receiver according to a fifth embodiment of the present invention.

FIG. 13A is a diagram for showing a configuration example of a separated charging cable receiver according to a fifth embodiment of the present invention. The charging cable receiver 28 includes a charging cable holding plate 283 that is rotatably supported by an axis on the front side of the bottom face of the body housing 21, and an arc-like cable receiving unit 281B that is formed integrally with the charging cable holding plate 283, and the cable receiving unit 281B can be housed in the storage space (see FIG. 5). At the time of non-charging, the cable receiving unit 281B is fixed while being pulled out on the near side from the body housing 21 (first position) to secure the cable receiving space 29 as shown in the drawing. At the time of charging, the cable receiving unit 281B is fixed while being housed in the storage space of the body housing 21 (second position). If the cable receiving unit 281B is further rotated from the first position, a space in communication with the storage space is formed between the body housing 21 and the cable receiving unit 281B (third position). At the third position, the operation of fixing the body housing 21 to the floor can be performed as described in FIG. 5. As described above, the cable receiving unit 281B can be fixed to the body housing 21 at the three different positions.

According to the embodiment, the charging cable receiver 28 holds the charging cable 25 at a stable position at the time of non-charging to prevent the cable from being damaged, and can be folded so as not to disturb the charging operation of a user at a narrow space at the time of charging.

Figure 13B:
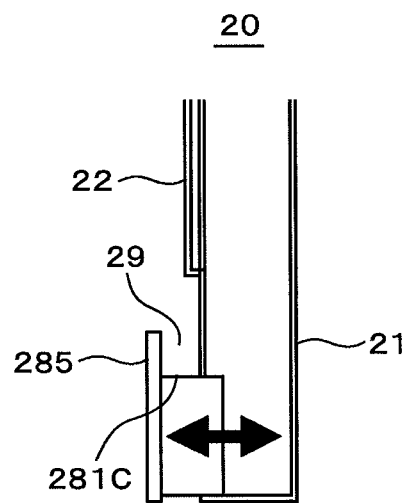
FIG. 13B is a diagram for showing another configuration example of the charging cable receiver according to the fifth embodiment of the present invention.

Further, according to another configuration example of the charging cable receiver shown in FIG. 13B, the charging cable receiver 28 can be horizontally put in or taken out from the storage space, and can be fixed to the body housing 21 at the three different positions as similar to the case of FIG. 13A. According to the embodiment shown in FIG. 13B, in a state where the charging cable receiver 28 is taken out, the charging cable receiver 28 holds the charging cable 25 at a stable position at the time of non-charging to prevent the cable from being damaged. In addition, the charging cable receiver 28 is pushed into the body housing 21 so as not to disturb the charging operation by a user at a narrow space at the time of charging. Further, the charging cable receiver 28 is pulled out from the body housing 21, so that the operation of fixing the body housing 21 to the floor can be performed.

Figure 13C:
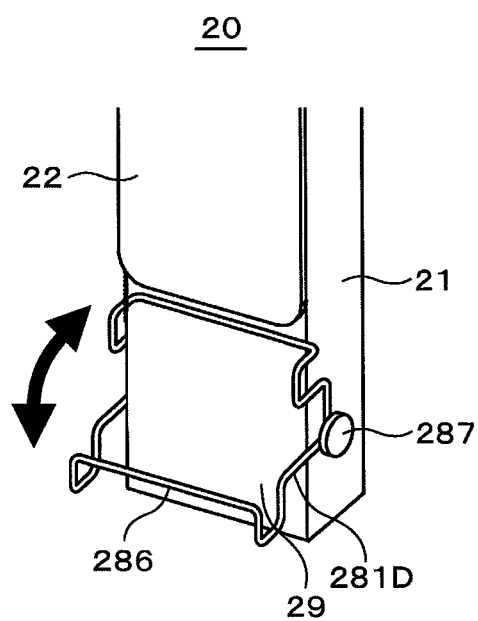
FIG. 13C is a diagram for showing still another configuration example of the charging cable receiver according to the fifth embodiment of the present invention.

Further, according to still another configuration example of the charging cable receiver shown in FIG. 13C, the charging cable receiver 28 includes a charging cable receiving frame 286 and a frame-like cable receiving unit 281D that is formed integrally with the charging cable receiving frame 286. In addition, the charging cable receiver 28 is rotatable about an axis 287 of the body housing 21 as shown by the arrow, and can be fixed to the body housing 21 at different first and second positions. According to the embodiment, the charging cable receiver 28 holds the charging cable 25 at a stable position at the time of non-charging to prevent the cable from being damaged, and is configured so as not to disturb the charging operation by a user at a narrow space at the time of charging. It should be noted that a detachable cover (not shown) is provided at the body housing 21 in the rear of the cable receiving unit 281D. The operation of fixing the body housing 21 to the floor can be performed by removing the cover. Since the cable receiving unit 281D has no bottom face, it is possible to prevent trash from being piled up in the cable receiving unit.

It should be noted that in any case of FIG. 13A to FIG. 13C, the cable receiving unit 281B or 281D can be automatically moved to the first and second positions using a relation between the weight (presence or absence of the charging cable) of the charging cable 25 affecting on the cable receiving unit and spring force, so that the burden on a user can be further lightened. Even in FIG. 13B, the cable receiver can be manually or automatically opened or closed.

According to the embodiment, even though the apparatus is a downsized and space-saving apparatus, it is possible to provide the quick charging stand in which the quick charging cable can be compactly stored, which is excellent in safety, and in which the burden on a user in operations is lightened.

Sixth Embodiment

In order to prevent a part of the charging cable from being brought into contact with the ground as much as possible, it is only necessary to provide not only the charging cable outlet 24 but also the charging connector housing unit 27 at a high position of the body housing 21. However, if the charging connector housing unit 27 is provided at a high position, it is disadvantageously difficult for a user to perform the charging operation.

Figure 14:
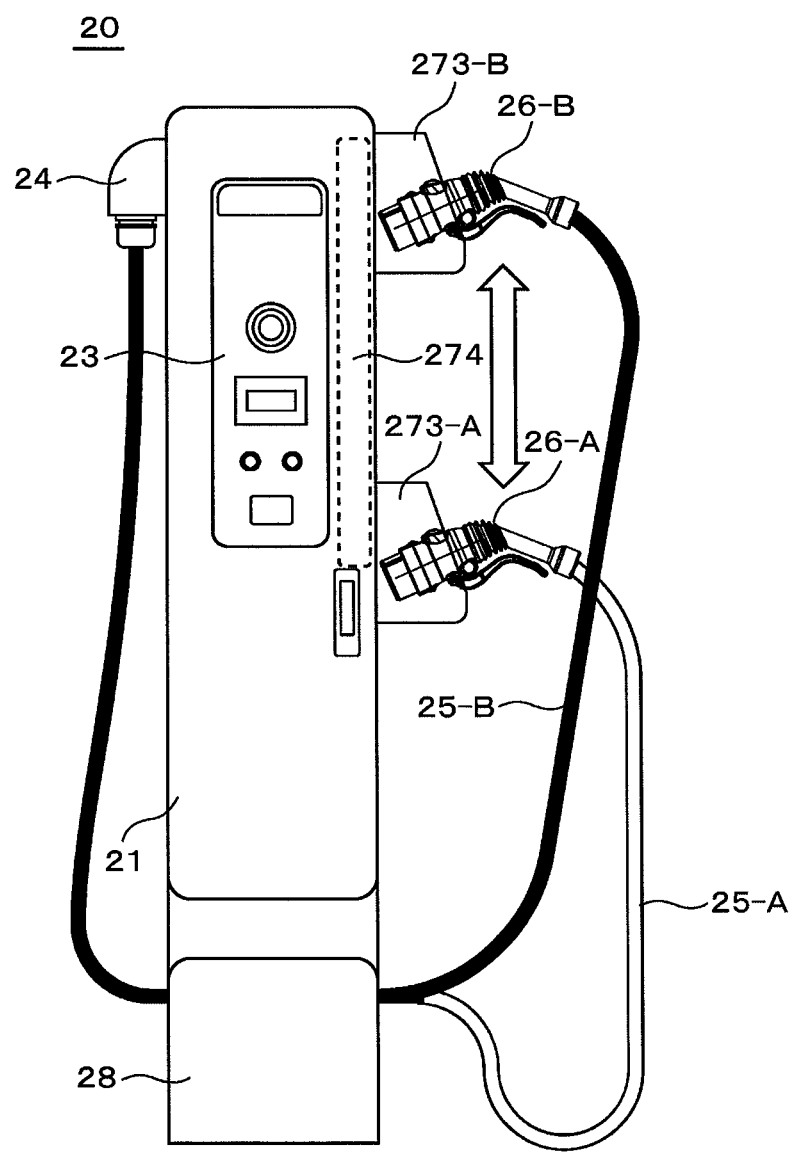
FIG. 14 is a front view for showing a separated quick charging stand with a movable charging connector housing unit according to a sixth embodiment of the present invention.

FIG. 14 shows a separated quick charging stand with a movable charging connector housing unit according to a sixth embodiment of the present invention. In the embodiment, a charging connector housing unit 273 is formed in a movable manner, and the position of the charging connector housing unit 273 can be changed on a side face of the body housing 21 by a driving mechanism 274 such as a motor. Specifically, a charging connector housing unit 273-A is positioned at an intermediate position of the body housing 21 at the time of charging, and a charging connector housing unit 273-B is positioned at a high position of the body housing 21 at the time of non-charging. A user may directly operate the position of the charging connector housing unit 273 with the operation display panel 23. Alternatively, by detecting the action of a user operating the operation display panel 23 for charging, the driving mechanism 274 may be allowed to be automatically driven to automatically operate the position of the charging connector housing unit 273.

According to the embodiment, even in the case where the length L of the charging cable is long, it is possible to prevent the charging cable 25 from being brought into contact with the ground as much as possible and to lighten the burden on a user in operations.

Seventh Embodiment

Figure 15A:
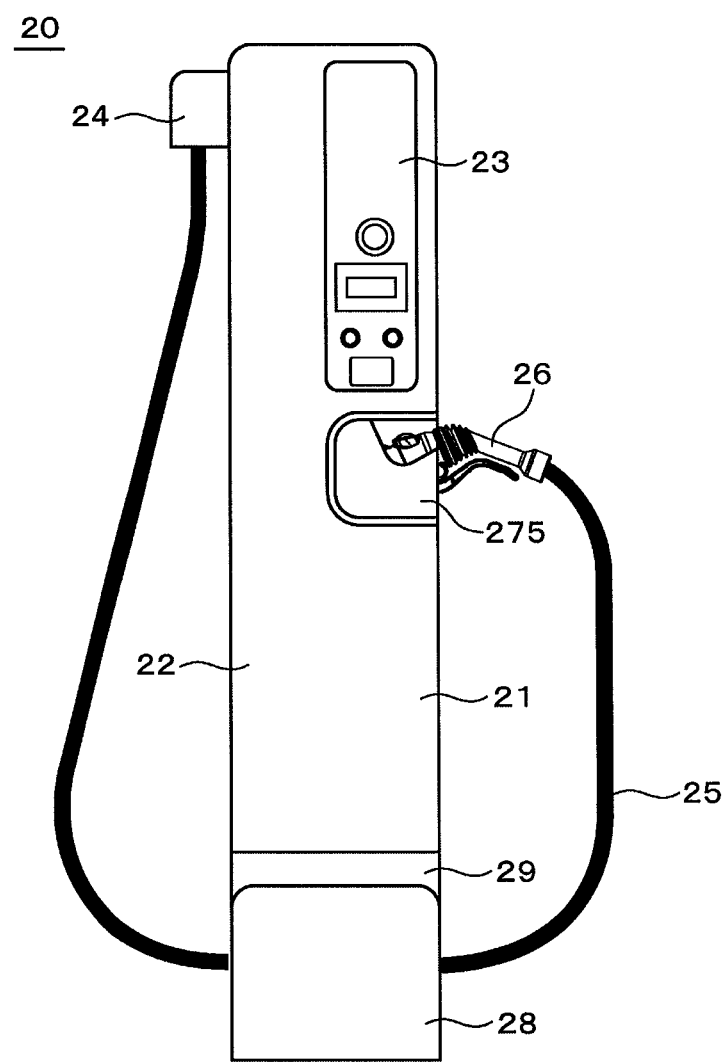
FIG. 15A is a front view for showing a separated quick charging stand with a charging connector housing unit provided on the front door side according to a seventh embodiment of the present invention.

Next, a separated quick charging stand with a charging connector housing unit provided on the front door side, as a seventh embodiment of the present invention, will be described. FIG. 15A is a front view of the seventh embodiment, FIG. 15B is a side view thereof, and FIG. 15C is a plan view thereof.

In any one of the above-described embodiments, the charging connector housing unit is formed on a side face of the body housing 21. In the seventh embodiment, the outlet 24 for the charging cable 25 is provided at an upper part of one side face of the body housing 21, and a charging connector housing unit 275 is provided at the body housing 21 by cutting out an upper part of the front door 22 or the front door 22. The mounting direction of the charging connector 26 with respect to the charging connector housing unit 275 is the same as the face of the front door 22. By changing the installation position of the movable charging connector housing unit 275, the horizontal width of the quick charging stand is made narrow as a whole. Such a quick charging stand is installed at a parking space with little room on the right and left sides and a little room on the front and rear sides, so that downsizing and space-saving can be realized as a whole.

Eighth Embodiment

Figure 16A:
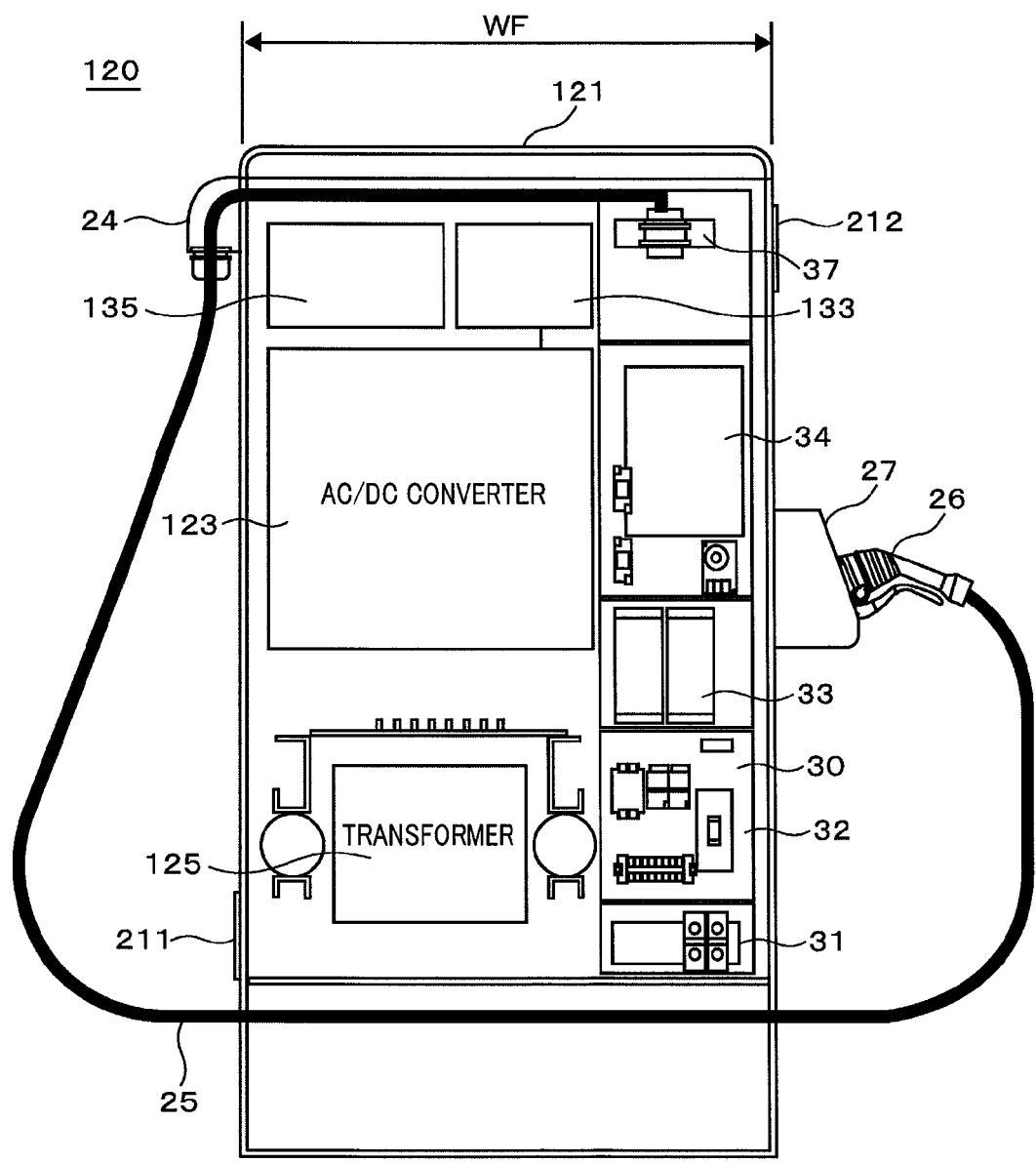
FIG. 16A is a front cross-sectional view of a quick charging system for an electric vehicle with an integrated quick charging stand according to an eighth embodiment of the present invention.
Figure 16B:
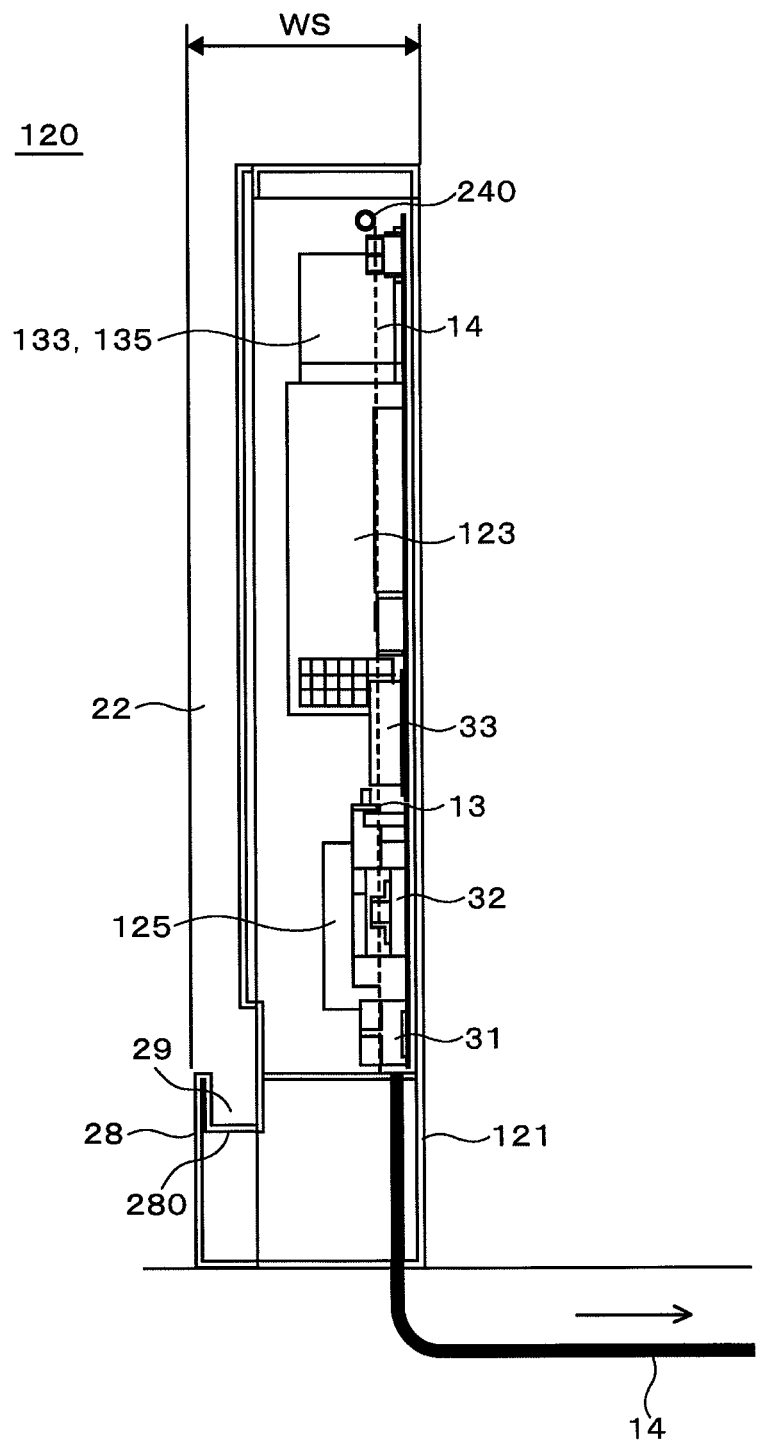
FIG. 16B is a side cross-sectional view of the integrated quick charging system according to the eighth embodiment.

Next, a quick charging system for an electric vehicle with an integrated quick charging stand according to an eighth embodiment of the present invention will be described. FIG. 16A is a front cross-sectional view of a quick charging system for an electric vehicle according to the eighth embodiment, and FIG. 16B is a side cross-sectional view of the quick charging system. The quick charging stand of the embodiment is different from the above-described separated quick charging stand in that a quick charging stand unit and a converter unit are housed in one apparatus. The configurations of the converter unit and the quick charging stand unit are the same as those of the converter and the quick charging stand of each of the above-described embodiments.

Specifically, an integrated quick charging stand 120 includes a body housing 121 formed in the shape of a rectangular parallelepiped-like box, a converter unit and a quick charging stand unit installed on the same plane (substrate) in the body housing, the charging cable outlet 24 from the quick charging stand unit provided at an upper part of the left side of the body housing 121, the charging connector 26 formed at a tip end of the charging cable 25, and the charging connector housing unit 27 provided at an intermediate part of the right side of the body housing 121. The charging cable receiver 28 is provided on the front face of the body housing 121 while protruding from a lower part of the front door 22, and the cable receiving space 29 is formed between the charging cable receiving unit 280 of the charging cable receiver 28 and the body housing 121. In a state where the charging connector 26 is stored in the charging connector housing unit 27, an intermediate part of the charging cable 25 is held at the cable receiving space 29. Inside the body housing 121, installed are a converter 123, a transformer 125, a breaker/terminal base 133, and a heat sink-integrated fan 135 all of which configure the converter unit. In addition, the quick charging stand unit includes a control unit configured similar to that of the quick charging stand of FIG. 3A. An operation display panel is provided at an upper part of a front door attached to the front face of the body housing 121. The cooling air sucking port 211 and the discharging port 212 are provided at a lower part on the left side and an upper part on the right side of the box, respectively.

A connection cable 13 for power supply connected to the transformer 125 of the converter unit is connected to the control unit of the charging stand unit. The connection cable 13 further extends upward, as a connection cable 14, from the control unit to be connected to the charging cable 25 at the cable holding unit 37 located at an uppermost part in the box. The charging cable 25 reaches the charging cable outlet 24 of the body housing 21 through the hole 240 provided at a side part of the box 121, and further extends outside the body housing 21. Electric power supplied from the cable 14 to a battery of a vehicle through the charging cable 25 is controlled by the control components 31 and 32 configuring the control unit of the stand unit. It should be noted that the positional relation between the charging cable outlet 24 and the charging connector housing unit 27 relative to the body housing 121 may be opposite.

The integrated quick charging stand of the embodiment can be made relatively compact as a converter-integrated apparatus. In addition, the charging connector 26 is taken out from the body housing sideways. Thus, one vehicle or two vehicles parked at two adjacent parking spaces can be charged by one quick charging stand. For example, the quick charging stand can be sufficiently installed even if, for example, a space between a parking space and a wall of a building is narrow, such as an indoor parking lot or a parking lot between buildings. As compared to the separated quick charging stand, the front width WF becomes long and the charging cable receiver 28 also becomes long. Thus, the charging cable 25 can be more stably held. On the other hand, due to the converter-integrated stand, the side width WS becomes long, and thus it is relatively difficult to install the stand at a parking space with little space in the front and rear directions. As an example, WF is 900 mm and WS is 350 mm. Thus, for example, even if an interval between the wheel stopper 43 and the wall 41 of a building is only about 1 m, there is no problem in installing the integrated quick charging stand 20.

According to the embodiment, even though the apparatus is a downsized and space-saving converter-integrated apparatus, it is possible to provide the integrated quick charging stand in which the quick charging cable can be compactly stored, which is excellent in safety, and in which the burden on a user in operations is lightened.

It is obvious that the configuration described in each of the first to seventh embodiments of the present invention can be similarly applied to the eighth embodiment depending on the intended use.

What is claimed is:

1. A quick charger for an electric vehicle comprising:
   a body housing including a front face, a side face, and another side face opposite to the side face;
   a control unit installed inside the body housing;
   an operation panel disposed on the front face of the body housing;
   a charging cable connecting the control unit to a charging connector;
   an outlet for the charging cable disposed on an upper end of the side face of the body housing;
   a charging connector housing unit disposed at a position lower than the outlet for the charging cable, in the vertical direction, on the another side face of the body housing to hold the charging connector in the body housing; and
   a charging cable receiver disposed at a lower part of the body housing near a ground surface on which the body housing is installed, wherein
   the charging cable receiver is configured to hold an intermediate part of the charging cable.

2. The quick charger for an electric vehicle according to claim 1, wherein
   the charging cable receiver is provided at a lower part of the front face of the body housing to hold the intermediate part of the charging cable on the front face of the body housing.

3. The quick charger for an electric vehicle according to claim 1, wherein
   a front door is provided on the front face of the body housing,
   the operation panel is installed on the front door, and an upper edge of the charging cable receiver is located at a position lower than a lower edge of the front door.

4. The quick charger for an electric vehicle according to claim 3, wherein
   the charging cable receiver has a cable receiving unit to hold the charging cable, a cable receiving space is formed between the cable receiving unit and the body housing, and the cable receiving space is surrounded by at least three walls so that the charging cable does not protrude from the cable receiving unit.

5. The quick charger for an electric vehicle according to claim 3, wherein
   the outlet for the charging cable is disposed at an uppermost part of the side face of the body housing, and the charging connector housing unit is disposed at an intermediate part of the another side face of the body housing.

6. The quick charger for an electric vehicle according to claim 3, wherein
   the height and width of the cable receiving unit are set so that, when the charging connector is held by the charging connector housing unit, the intermediate part of the charging cable is not brought into contact with the ground surface on which the body housing is installed.

7. The quick charger for an electric vehicle according to claim 1, wherein
   when the charging connector is held by the charging connector housing unit, the charging connector is oriented orthogonal to the front face of the housing unit.

8. The quick charger for an electric vehicle according to claim 1,
   wherein the body housing includes a blower,
   wherein a sucking port to intake air into the body housing to cool off the inside of the body housing is arranged at a lower part of the side face of the body housing, a discharging port is arranged at an upper part of the another side face of the body housing to discharge the air
   the charging connector housing unit is arranged at a position lower than the discharging port, and
   the blower produces air flow distributing the air taken in from the sucking port to the discharging port.

9. The quick charger for an electric vehicle according to claim 3, wherein
   the cable receiving unit is provided with a member to reduce friction between the cable receiving unit and the charging cable.

10. The quick charger for an electric vehicle according to claim 1, wherein
    a storage space is provided at a lower part of the body housing to store the charging cable receiver, and the bottom face of the body housing is configured to be fixed to a floor face with anchor bolts, and the charging cable receiver is removable from the storage space.

11. The quick charger for an electric vehicle according to claim 1, wherein
    the charging cable receiver is disposed on an outer surface of the body housing.

12. The quick charger for an electric vehicle according to claim 1, wherein
the height of the charging connector housing unit is adjustable the another side face of the body housing, and the charging connector housing unit is configured as a movable charging connector housing unit that allows the charging connector housing unit to be positioned at a high position relative to the body housing.

13. A quick charging system comprising:
a converter having a control unit; and
at least one separated quick charging stand connected to the converter through a connection cable, the separated quick charging stand comprising:
a body housing including a front face, a side face, and another side face opposite to the side face;
a control unit that is installed inside the body housing and is connected to the connection cable;
an operation panel disposed on the front face of the body housing and functions as an input/output unit for the control unit;
a charging cable connecting the control unit to a charging connector;
an outlet for the charging cable disposed on an upper end of the side face of the body housing;
a charging connector housing unit disposed at a position lower than the outlet for the charging cable, in the vertical direction, on the another side face of the body housing to hold the charging connector in the body housing; and
a charging cable receiver disposed at a lower part of the front face of the body housing near a ground surface on which the body housing is installed, wherein
the charging cable receiver is configured to hold an intermediate part of the charging cable on the front face of the body housing.

14. A quick charging system comprising:
a body housing including a front face, a side face, and another side face opposite to the side face;
a converter unit installed inside the body housing and has a converter and a control unit for the converter;
a quick charging stand unit installed on the same plane as the converter unit in the body housing and has a control unit;
an operation panel disposed on the front face of the body housing;
a charging cable connecting the control unit of the quick charging stand unit to a charging connector;
an outlet for the charging cable disposed on an upper end of the side face of the body housing;
a charging connector housing unit disposed at a position lower than the outlet for the charging cable, in the vertical direction, on the another side face of the body housing to hold the charging connector in the body housing; and
a charging cable receiver disposed at a lower part of the front face on the outside of the body housing near a ground surface on which the body housing is installed, wherein
the charging cable receiver is configured to hold an intermediate part of the charging cable on the front face of the body housing.

* * * * *